Feb. 24, 1942.  A. L. DONAHEW  2,273,842
TORQUE TRANSMISSION DEVICE
Filed July 16, 1940  4 Sheets-Sheet 3
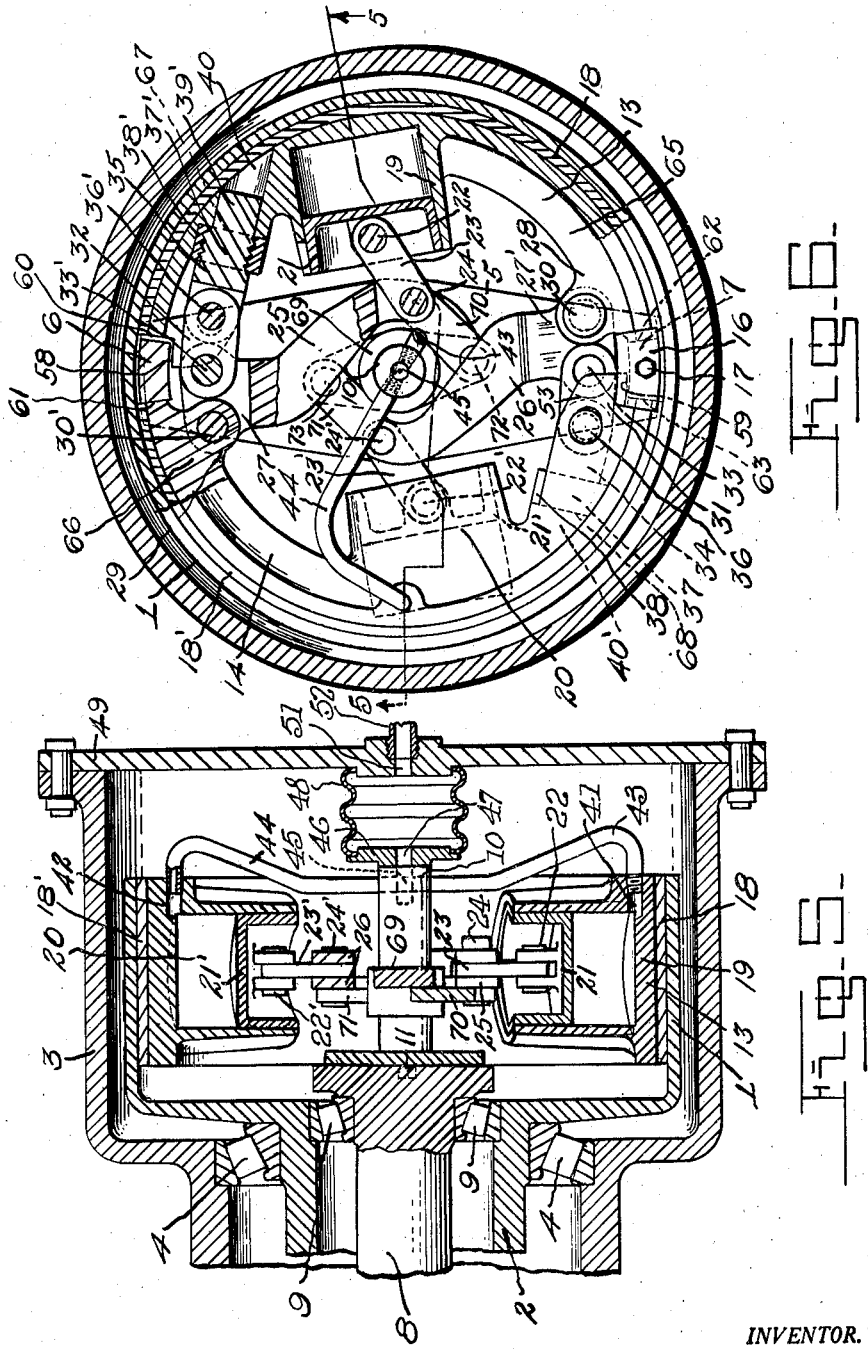
INVENTOR.
Arthur L. Donahew
BY
Francis F. Vanderwerf
ATTORNEY.

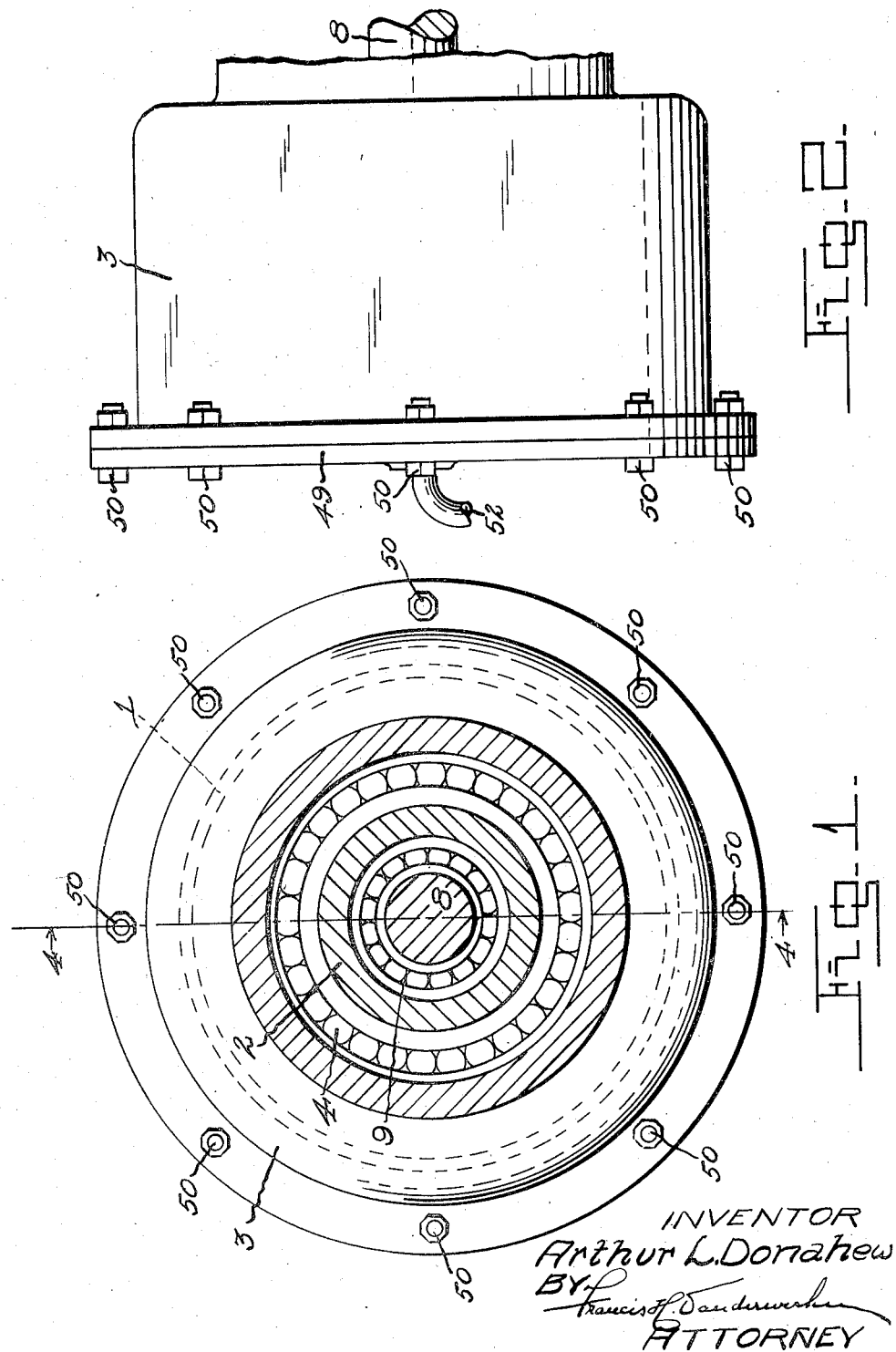

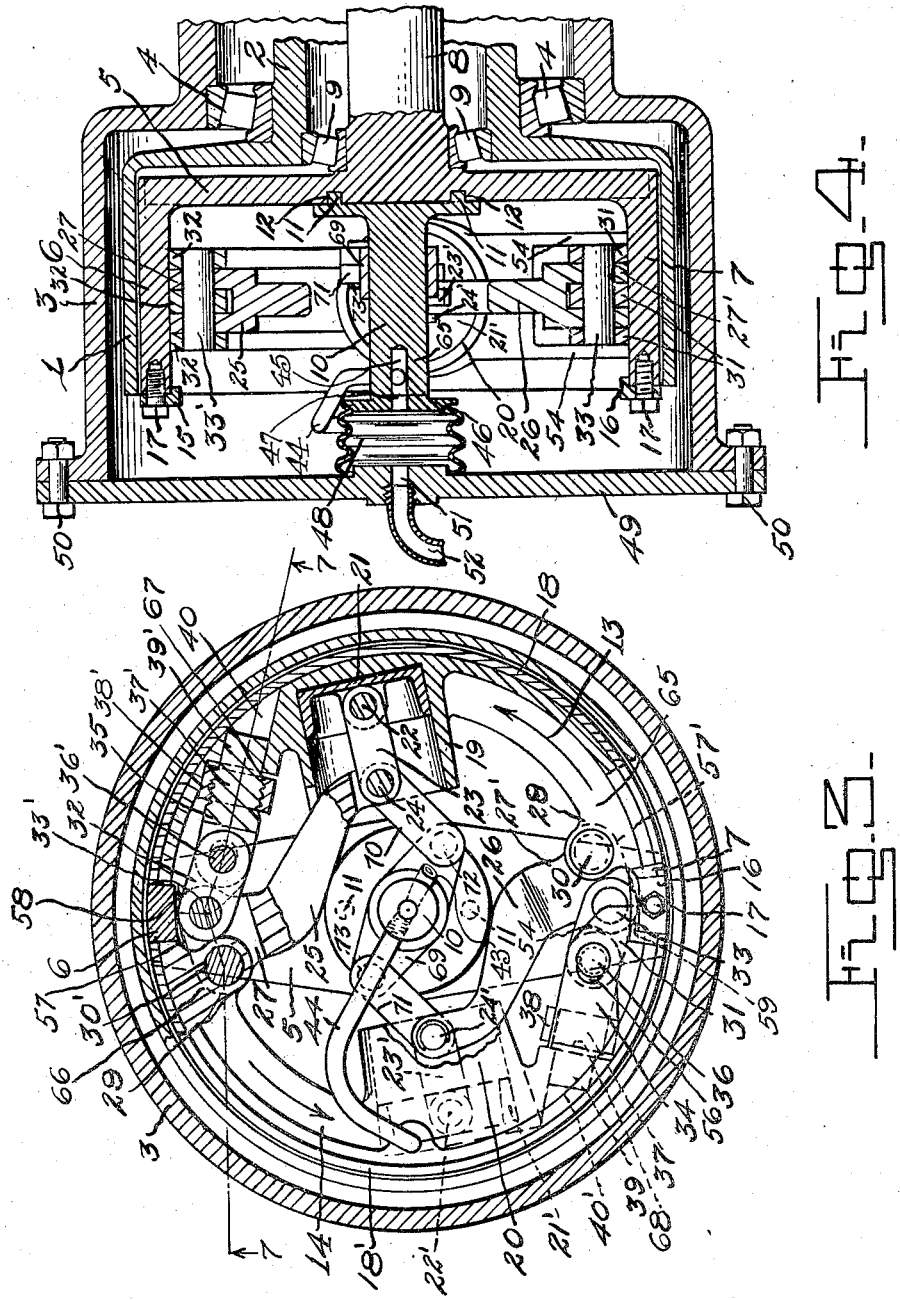

Feb. 24, 1942.   A. L. DONAHEW   2,273,842
TORQUE TRANSMISSION DEVICE
Filed July 16, 1940   4 Sheets-Sheet 4

INVENTOR
Arthur L. Donahew
BY *Francis H. Vanderwerken*
ATTORNEY

Patented Feb. 24, 1942

2,273,842

UNITED STATES PATENT OFFICE 2,273,842

TORQUE TRANSMISSION DEVICE

Arthur L. Donahew, Fort Belvoir, Va.

Application July 16, 1940, Serial No. 345,796

8 Claims. (Cl. 192—85)

(Granted under the act of March 3, 1883, as amended April 30, 1928; 370 O. G. 757)

This invention described herein may be manufactured and used by or for the Government for governmental purposes, without the payment to me of any royalty thereon.

This invention relates to a torque transmitting device of the internal shoe type and the primary object thereof is to provide a device of this type having inherent dynamic balance and free from any unbalanced forces.

Another object of the invention is to provide a torque transmission clutch of the internal shoe type wherein the centrifugal force of the shoes is balanced or overcome so that rotation does not tend to engage the clutch and to provide for the automatic disengagement of the clutch when a predetermined speed is reached.

A still further object of the invention is to provide a torque transmission device of the internal shoe type, which is simple in construction, cheap to manufacture and having parts which can be assembled, adjusted and disassembled easily without disturbing adjacent parts thereof.

The structure described herein is particularly adapted for application to the mechanical transmission device disclosed in the pending application of John W. Marsh and Chauncey F. C. Magee, Serial No. 199,274, filed March 31, 1938, abandoned August 27, 1940.

Briefly stated, the invention comprises a drum within which are mounted a pair of identical clutch shoes each of which has embodied therein a cylinder containing a fluid operated piston. Expanding means comprising levers and toggle mechanisms are provided between each piston and the ends of the shoes. Application of fluid pressure behind the pistons moves the shoes into contact with the drum and expands the shoes against the drum. All masses and all forces are diametrically opposite and balanced within the clutch mechanism. The weights of the pistons and associated mechanisms are so arranged that the centrifugal forces of the pistons and associated mechanisms, acting through the expanding means, are equal to or may be greater than the centrifugal force of the shoes (tending to engage the shoes with the drum). When the weight of the pistons and associated mechanisms, acting through the expanding means, produces a contracting force greater than the expanding force produced by the centrifugal action of the shoes, rotation of the parts keeps the clutch disengaged. When fluid pressure applied to the pistons engages the clutch, the weight of the pistons and associated parts can be arranged to produce a disengaging force overcoming the expanding force of the fluid pressure at any predetermined speed.

With the above and other objects and advantages in view, the invention consists of certain features of construction and operation of parts which will hereinafter appear and in which:

Fig. 1 is a front end view partly in section of the improved torque transmission device;

Fig. 2 is a fragmentary side elevation thereof;

Fig. 3 is a partial sectional view of the device in a disengaged position with the greater part of the rear portion thereof removed therefrom;

Fig. 4 is a vertical sectional view of the device in a disengaged position taken on the line 4—4 of Fig. 1;

Fig. 5 is a longitudinal sectional view of the device in an engaged position taken on the line 5—5 of Fig. 6;

Fig. 6 is a cross-sectional view partly in elevation of the device also in the engaged position;

Figure 7:
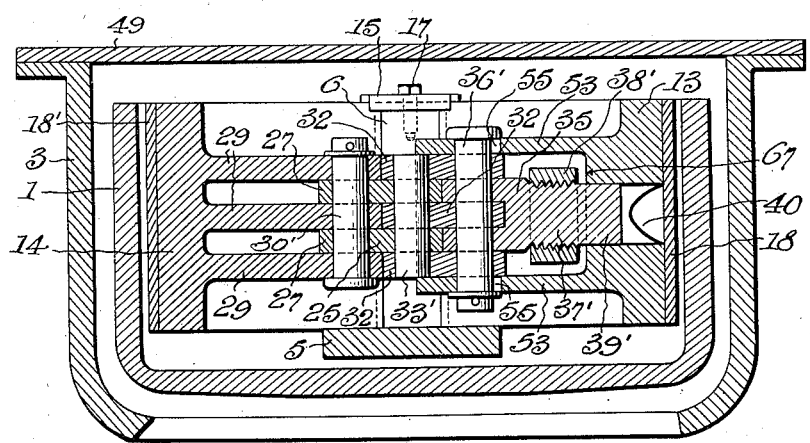
Fig. 7 is an enlarged sectional view partly in elevation of an expanding and contracting mechanism in a disengaged position including a portion of a transmission case taken on the line 7—7 of Fig. 3.
Figure 8:
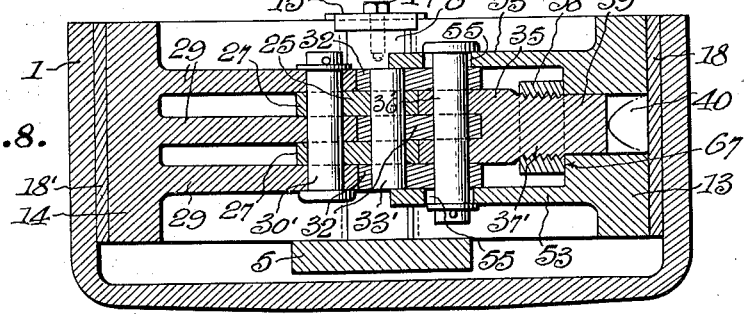
Fig. 8 is an enlarged sectional view partly in elevation of the expanding and contracting mechanism in an engaged position with the transmission case removed therefrom.
Figure 9:
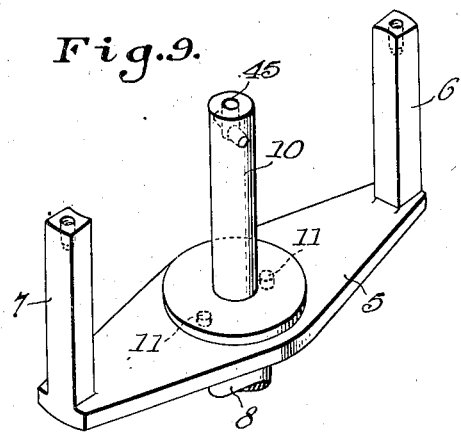
Fig. 9 is a fragmentary perspective detail view of a driving member and shaft extension used in carrying out the invention.
Figure 10:
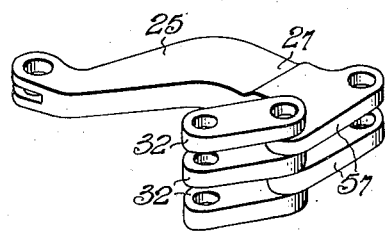
Fig. 10 is a perspective detail view of an operating lever and toggle links also used in carrying out the invention.

In the illustrated embodiment characterizing the invention 1 indicates a clutch drum formed integral with a driven member 2 and supported in a transmission case 3 by roller bearings 4. A driving member 5 illustrated in detail in Fig. 9, carrying extension members or driving lugs 6 and 7, is attached to a drive shaft 8 suitably mounted in roller bearings 9 provided within the driven member 2. An extension 10, the purpose of which will hereinafter be described, abuts at its inner end against the inner end of the drive shaft 8 and is fixedly connected therewith in any suitable manner such as by means of projections 11 which are pressed fitted into recesses 12 formed in the driving member 5 whereby the members 8 and 10 may be rotated together. Clutch shoes 13 and 14 are provided which are identical in form and retained in operative position within the transmission case 3 by retaining members 15 and 16 which are secured by bolts 17 to the driving lugs 6 and 7. The clutch shoes 13 and 14 are provided with suitable wear surfaces 18 and 18' and cylinders 19 and 20 respectively containing fluid operated pistons 21 and 21' connected by pins 22 and 22', piston links 23 and 23' and pins 24 and 24' to the inner ends of levers 25 and 26 respectively. The outer ends 27 and 27' of the levers 25 and 26 are bifurcated as illustrated in Fig. 10 to engage lugs 28 and 29 provided on the shoes 13 and 14 respectively by means of pins 30 and 20' and also to engage toggle links 31 and 32 by pins 33 and 33', the said toggle links 31 and 32 also engaging adjusting heads 34 and 35 respectively by means of pins 36 and 36'. The adjusting heads 34 and 35 are provided with threaded portions 37 and 37' carrying adjusting nuts 38 and 38' and with extensions 39 and 39' fitting into recesses 40 and 40' formed in the shoes 13 and 14. The cylinders 19 and 20 are provided with ports 41 and 42 respectively illustrated more particularly in Fig. 5, which are connected by flexible conduits 43 and 44 to an aperture 45 formed in the shaft extension 10. Engaging the inner end of the shaft extension 10 is a plate 46 containing an orifice 47 which registers with the aperture 45 in the shaft extension as illustrated in Fig. 4. A flexible bellows 48 is attached to the plate 46 and to a cover 49 which is attached to the rear of the transmission case 3 by bolts 50 or the like. The cover 49 of the transmission case 3 is provided with a central orifice 51 which leads into the bellows 48 and to which is attached a conduit 52 leading to a source of operating fluid (not shown). The adjusting heads 34 and 35 are contained within the recesses 40 and 40' in the shoes 13 and 14 and the recesses 40 and 40' are formed by walls 53 and 54 having elongated slots or holes 55 and 56 respectively provided therein through which the pins 36 and 36' extend, as illustrated more particularly in Figs. 7 and 8, which are enlarged sectional views through an expanding and contracting mechanism both in a disengaged and engaged position for one of the clutch shoes.

In operation when the drive shaft 8, driving member 5 and the extensions 6 and 7 thereof are rotated, carrying with them the clutch shoes 13 and 14, a centrifugal force is set up in the shoes and their associated mechanisms. This centrifugal force in the shoes 13 and 14 tends to engage the shoes with the drum 1. A centrifugal force also exists in the pistons 21 and 21' contained within the cylinders 19 and 20 and associated mechanisms.

The centrifugal force applied to the pistons 21 and 21' operating through the links 23 and 23' and levers 25 and 26, maintains a centrifugal force on the pins 33 and 33' maintaining the surfaces 57 and 57' on the outer bifurcated ends 27 and 27' of the levers 25 and 26 against certain sides of the driving member extensions 6 and 7 respectively, and centripetal force on pins 30 and 30' engaging lugs 28 and 29 on the shoes 13 and 14 thereby maintaining the surfaces 58 and 59 on the shoes in contact with the driving member extensions 6 and 7. Simultaneously the adjusting heads 34 and 35 are drawn toward the driving member extensions 6 and 7 through the toggle links 31 and 32 and pins 36 and 36' engaging the outer surfaces of the elongated slots 55 and 56 in the shoe walls 53 and 54 and drawing the shoes 13 and 14 together until the surfaces 60 and 61 on one side thereof and surfaces 62 and 63 on the other side thereof contact with the driving member extensions 6 and 7 respectively. The weight of the pistons 21 and 21' and associated mechanisms are such that their centrfugal force multiplied by the leverage obtained through the toggle mechanism exerts a disengaging force on the shoes 13 and 14 greater than the engaging force exerted by the centrifugal force on the shoes, by reason of their own weight, and the shoes when rotated without fluid pressure in the operating cylinders 19 and 20 will contract, gripping the driving lever extension 5 and 6 and maintaining a rigid rotating mechanism free from contact with the clutch drum 1.

When fluid pressure is applied through the conduit 52 and orifice 51 in the cover 49 of the transmission case 3 pressure is exerted within the bellows 48 and on the plate 46, whereby the plate 46 is forced into contact with the end 64 of the drive shaft extension 10 maintaining a substantially fluid-tight joint between the plate 46 and the end 64 of the shaft extension. The fluid pressure will then be conducted through the orifice 47 to the hole 45 thence through the flexible conduits 43 and 44 to the cylinders 19 and 20 respectively in shoes 13 and 14 respectively, whereby the pistons 21 and 21' in the cylinders 19 and 20 are forced inwardly toward the shaft extension 10. This inward movement of the pistons 21 and 21' exerts through links 23 and 23' and inward force on the inner ends of the levers 25 and 26 rotating the levers about pins 30 and 30' and 33 and 33'. This rotation of the outer ends 27 and 27' of levers 25 and 26 forces the ends 65 and 66 of the shoes 13 and 14 respectively adjacent to the lugs 28 and 29, radially outward against the drum 1; simultaneously forcing pins 33 and 33' radially inward and forcing pins 36 and 36' substantially tangentially through toggle links 31 and 32. The tangential force on pins 36 and 36' forces the adjusting heads 34 and 35 tangentially and causes the pins 36 and 36' to slide in the elongated apertures 55 and 55' and the extensions 39 and 39' of the adjusting heads 34 and 35 to recesses 40 and 40' formed in the shoes 13 and 14 respectively, until the adjusting nuts 38 and 38' contact surfaces 67 and 68 on shoes 13 and 14 respectively. An expanding force is thus exerted between the lugs 28 and 29 on the ends 65 and 66 of the shoes and surfaces 67 and 68 expanding the shoes 13 and 14 against the drum 1. It will be noted, however, that before any expanding force is exerted between the shoes, the ends 65 and 66 of the shoes adjacent to the lugs 28 and 29 are forced radially against the drum so that the engagement between the shoes 13 and 14 and the drum 1 is progressive, starting at the ends 65 and 66 adjacent to the lugs 28 and 29. This progressive engagement forces out any liquid which may be between the shoes 13 and 14 and the drum 1. Moreover, since the shoes 13 and 14 are not attached to either the drum 1 or the driving mechanism but float within the drum, a uniform contact pressure is applied between the surface of the shoes and the drum.

The drive is effected by contact between surfaces 60 and 63 on shoes 13 and 14 respectively, and the driving member extensions 6 and 7 or between surfaces 61 and 62 on the shoes and the driving member extensions 6 and 7 in the direction of rotation. Equal movement of the pistons 21 and 21' is produced by equalizing lever 69 rotatively mounted on extension 10 and connected to levers 25 and 26 by links 70 and 71 through pins 72 and 24 and pins 73 and 24' respectively.

Since a disengaging effect is exerted by the centrifugal force of pistons 21 and 21' and associated parts, the fluid pressure applied on the pistons to engage the clutch must be sufficient to overcome the centrifugal force. When rotative speed exerts sufficient centrifugal force on the pistons 21 and 21' to overcome the fluid pressure, the shoes 13 and 14 will be contracted and the clutch disengaged, preventing transmission of torque at speeds greater than that predetermined by the relative weights of the members and the fluid pressure applied.

Adjustment is effected by rotating the adjusting nuts 38 and 38' on the threaded portions 37 and 37' of the adjusting heads 34 and 35, until the desired angle between levers 25 and 26 and toggle links 31 and 32 is obtained when the shoe liners 18 and 18' on the shoes 13 and 14 respectively, are in contact with the drum 1.

It will be apparent since all parts are symmetrical about the center that no unbalanced forces due to the rotation of the parts can exist. It will also be apparent, moreover, that all forces due to applied pressure are balanced by equal opposed forces and that the turning movement on the driving member 2 is balanced so that no extraneous forces are applied to the driving or driven member.

It will be observed that no attachment exists between the shoes 13 and 14, associated mechanism, the driving members drum 1 or cover 49, although the shoes and associated mechanism are substantially rigid with the driving mechanism when rotating either by the action of fluid pressure or centrifugal force on the parts, thus when the device is not rotating and the cover 49 is removed, the entire assembly of shoes and associated mechanisms can be removed without detachment of any member.

With the arrangement shown on the accompanying drawings, the rotation of the shoes 13 and 14 in an anticlockwise direction, as indicated by the arrows when viewed as in Fig. 3, will increase the grip when the shoes contact with the drum 1, because of the drag effect. Similarly the rotation of the shoes in a clockwise direction will decrease the grip when the shoes contact with the drum. When the shoes 13 and 14 are reversed so that the sides next to the driving member 5 are next to the cover 49 on the transmission case 3, this action will be reversed.

It will thus be seen that there is herein provided a novel torque transmitting device, which is well adapted for all the purposes indicated. Even though there has been herein described certain features of construction and operation of parts, it is nevertheless to be understood that various changes may be made therein, if the changes do not depart from the spirit or scope of the claims.

Having described my invention, what I claim as new and wish to secure by Letters Patent is:

1. In a rotative gripping device, a drum, gripping shoes including ends floatingly positioned within said drum, cylinders provided on said shoes intermediate the ends thereof, said cylinders adapted to have a fluid pressure applied therein, pistons operative within said cylinders, means actuated by said pistons to engage said shoes with said drum when pressure is applied within said cylinders, said means operatively connected to produce a centrifugal force on one end of each of said shoes and a tangential force on one of each of the other ends thereof whereby the entire length of said shoes is expanded against said drum and means for applying fluid pressure to said cylinders.

2. In a rotative gripping device, a drum, gripping shoes including ends floatingly positioned within said drum, means adapted to expand said shoes against said drum, said means operatively connected to produce a centrifugal force on one end of each of said shoes and a tangential force on one of each of the other ends thereof, whereby the entire length of said shoes is expanded against said drum, a driving member positioned coaxially within said drum and equally spaced arms connected to said driving member, said shoes adapted to transmit tangential forces between said drum and said arms, said tangential forces being divided equally over said arms.

3. In a rotative gripping device, a drum, a plurality of gripping shoes including ends floatingly positioned within said drum, a plurality of means adapted to expand said shoes against said drum, said means operatively connected to produce a centrifugal force on one end of each of said shoes and a tangential force on one of each of the other ends thereof, whereby the entire length of said shoes is expanded against said drum, a driving member positioned axially within said drum and in a plurality of driving contacts with said shoes, each of said shoes, means and driving contacts being identical, equiangularly spaced and having an equal moment arm about a center of said drum.

4. In a rotative gripping device, a drum, a plurality of gripping shoes including ends floatingly positioned within said drum, a plurality of means adapted to expand each of said shoes against said drum, said means operatively connected to produce a centrifugal force on one end of each of said shoes and a tangential force on one of each of the other ends thereof, whereby the entire length of said shoes is expanded against said drum, a driving member positioned axially within said drum, said driving member being in dynamic balance and having a plurality of driving contacts with said shoes, each of said shoes, means and driving contacts being equiangularly spaced and having an equal moment arm about the center of said drum.

5. In a rotative gripping device, a drum, gripping shoes adjacently and floatingly positioned within said drum, said gripping shoes having ends adjacent to each other, a lever attached to one end of each of said shoes, links attached to each of said levers and to an adjacent end of an adjacent shoe, said levers and links forming toggle mechanisms operatively connected to produce a centrifugal force on one end of each of said shoes and a tangential force on the said adjacent end of the said adjacent shoe whereby the entire length of said shoes is expanded against said drum.

6. In a rotative gripping device, a drum, a driving member positioned axially within said drum, arms connected to said driving member and projecting within said drum, gripping shoes floatingly positioned within said drum, said shoes having attached ends adjacent to each other, levers including inner ends adapted to have a centrifugal force applied thereto and extending from the ends of said shoes toward the center of said gripping device, links connected to said levers and forming toggle mechanisms between the adjacent ends of said shoes, said levers arranged to fulcrum on inner surfaces of said arms and to produce a centripetal force on the attached ends of said shoes when a centrifugal force is applied to inner ends of said levers.

7. In a rotative gripping device, a drum, a driving member positioned axially within said drum, arms including inner surfaces connected to said driving member and projecting within said drum, gripping shoes floatingly positioned within said drum, said shoes having attached ends adjacent to each other, each of said shoes having a projection thereon adapted to engage inner surfaces of said arms, levers including inner ends adapted to have a centrifugal force applied thereto and extending from the ends of said shoes toward a center of said gripping device, links connected to said levers and forming toggle mechanisms between adjacent ends of said shoes, said levers arranged to fulcrum on the inner surfaces of said arms and adapted to produce a centripetal force on the attached ends of said shoes when a centrifugal force is applied to inner ends of said levers to bring said shoe projections into contact with the inner surfaces of said arms.

8. In a torque transmission device, the combination of a driven member, a driving member having axially extending arms positioned coaxially with respect to said driven member, free floating friction shoes positioned for actuated engagement with respect to said driven member, said shoes having their ends arranged to abut against said arms for rotary movement, a series of interconnected levers tying said shoes together, and fluid pressure means interconnecting said shoes and levers to actuate said device.

ARTHUR L. DONAHEW.